United States Patent [19]

Saito et al.

[11] 4,311,368
[45] Jan. 19, 1982

[54] LIGHT SHIELDING MATERIAL

[75] Inventors: Takeshi Saito; Takashi Ueno, both of Ohtsu; Hideo Kashiwagi, Tokyo, all of Japan

[73] Assignee: Toray Industries, Inc., Tokyo, Japan

[21] Appl. No.: 46,629

[22] Filed: Jun. 8, 1979

[30] Foreign Application Priority Data

Jun. 8, 1978 [JP] Japan .................. 53-69049

[51] Int. Cl.$^3$ .................. G02C 7/10; G02C 7/16
[52] U.S. Cl. .................. 351/165; 351/45
[58] Field of Search .................. 351/44, 45, 163-165

[56] References Cited

U.S. PATENT DOCUMENTS

| | | | |
|---|---|---|---|
| 1,865,691 | 7/1932 | Hill | 351/44 X |
| 3,512,880 | 5/1970 | Alexander et al. | 351/45 |
| 3,664,733 | 5/1971 | Kalkowski | 351/45 |
| 4,076,395 | 2/1978 | Deeg et al. | 351/165 |
| 4,080,051 | 3/1978 | Krohn et al. | 351/165 |

OTHER PUBLICATIONS

Brit. J. Physiol. Opt., 24(3) 161 (1967), p. 180.

Primary Examiner—John K. Corbin
Assistant Examiner—Scott J. Sugarman
Attorney, Agent, or Firm—Armstrong, Nikaido, Marmelstein & Kubovcik

[57] ABSTRACT

A light shielding material having a gradient of the luminous transmittance in the vertical direction and comprising at least two regions consecutive to each other and different from each other in the luminous transmittance is provided. The luminous transmittance of one region is in the range of from 30% to 75% and the luminous transmittance of the other region is up to 25%, and said other region includes a portion in which the difference of the luminous density is at least 0.35 per 10 mm of the distance in the vertical direction. This light shielding material is advantageously used for glare-reducing glasses, glare-reducing filters, visors and the like.

8 Claims, 4 Drawing Figures

LIGHT SHIELDING MATERIAL

BACKGROUND OF THE INVENTION (1) Field of the Invention

The present invention relates to a light shielding material in which specific gradient of the luminous density is formed so that transmittance of rays of the visible region is controlled. This light shielding material exerts very excellent effects when it is used as glare-reducing glasses for drivers of automobiles and the like.

(2) Description of the Prior Art

As glare-reducing glasses suitable for driving of automobiles and the like, there are known various glasses. For example, yellow glasses and Nd ion-incorporated lenses are known as glare-reducing glasses for the night driving and colored lenses commercially available as sunglasses or fashion glasses, mirror lenses and polarizing lenses are known as glare-reducing glasses for the daytime driving. It has been pointed out in the art that yellow glasses and Nd ion-incorporated lenses are not satisfactory in the glare-reducing effect in the night driving. In case of colored lenses known as sunglasses, when they are used for the night driving, it is very difficult to maintain a sufficient glare-reducing effect and a sight reduction-preventing effect in combination, and as is well known, lenses having a satisfactory glare-reducing effect are apparently defective in that since the sight is drastically reduced in the night driving, there is inevitably included a risk when they are used for the night driving.

SUMMARY OF THE INVENTION

We made researches in such state of the art with a view to developing a light shielding material exerting an excellent glare-reducing effect not only in the night but also in the daytime and not causing practically significant reduction of the sight, and as a result, it was found that by provision of a specific structure having a gradient of the luminous density in the vertical direction, two contradictory requirements, that is, enhancement of the glarereducing effect and prevention of reduction of the sight, can be simultaneously satisfied. Based on this finding, we have now completed the present invention.

It is therefore a primary object of the present invention to provide a light shielding material having the above-mentioned properties.

In accordance with the fundamental aspect of the present invention, this and other objects can be attained by a light shielding material having a gradient of the luminous transmittance (T) in the vertical direction, which comprises at least two regions I and II differing in the luminous transmittance (T), said region I having a width of at least 5 mm in the vertical direction and a luminous transmittance (T) of 30 to 75% under the photopic vision condition, and said region II being disposed above said region I and consecutive thereto and including a portion in which the difference of the luminous density, expressed in terms of the common logarithm of the reciprocal of the luminous transmittance (T), is at least 0.35 per 10 mm of the vertical distance and a portion in which the luminous transmittance (T) is up to 25%.

According to one embodiment of the present invention, there is provided a light shielding material comprising the above-mentioned region I as a central region, the abovementioned region II as an upper region and a region III being disposed below the central region I and consecutive thereto, in which the luminous transmittance (T) is preferably 30 to 100%.

By the term "luminous transmittance (T) under the photopic vision condition" used in the instant specification and appended claims is meant a measured value based on the luminosity curve of a standard observer under the photopic vision condition, and the definition and measurement method are described in detail in JIS K-6718 and the like. In principle, the luminous transmittance (T) is calculated according to the following formula:

$$T = K \int_{380nm}^{780nm} P(\lambda)V(\lambda)\tau(\lambda)d\lambda$$

wherein $P(\lambda)$ stands for the spectral distribution of the CIE (Commission Internationale de l'Eclairage) standard illuminant C, $V(\lambda)$ stands for the CIE relative luminous efficiency (photopic vision), $\tau(\lambda)$ stands for the spectral transmittance of the sample, and K is a coefficient represented by the following formula:

$$100 / \int_{380nm}^{780nm} P(\lambda)V(\lambda)d\lambda$$

The value of the luminous transmittance (T) can be directly read from an integration spheretype photometer.

Incidentally, the "luminous density" is expressed in terms of the common logarithm of the reciprocal of the luminous transmittance (T).

Visible rays or illuminants are electromagnetic waves having a wavelength that eyes of a man can sense and recognize as light, and they show colors differing according to the wavelength. The wavelength range of visible rays differs among individuals, but generally, the upper limit is about 7600 to about 8000 Å and the lower limit is about 3800 to 4000 Å.

As described in detail hereinafter, according to the present invention, there can be obtained a light shielding material in which two contradictory requirements, that is, enhancement of the glare-reducing effect and prevention of reduction of the sight, can be simultaneously satisfied, and in the light shielding material of the present invention, these effects can be sufficiently attained not only in the night but also in the daytime. Therefore, the present invention makes epoch-making contributions to the art.

DETAILED DESCRIPTION OF THE PREFERRED EMBODIMENTS

Figure 1:
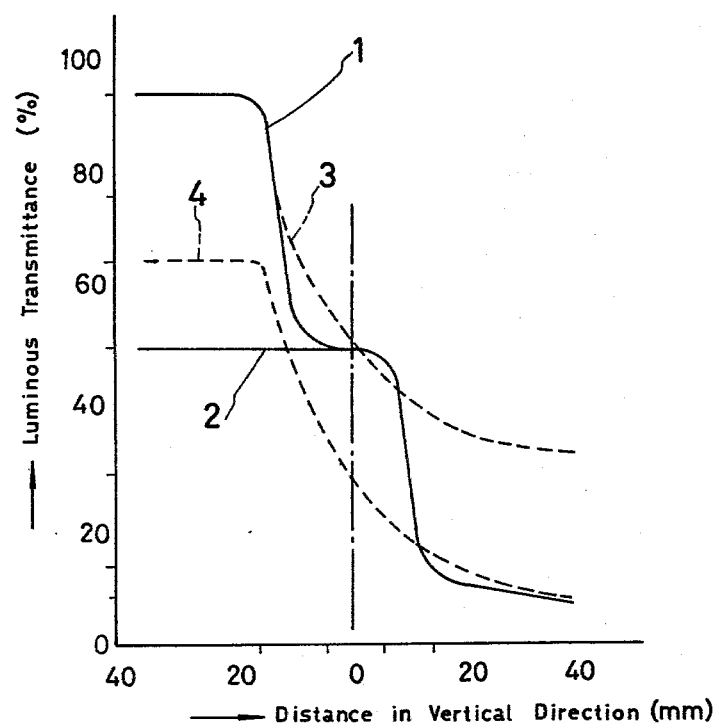
FIG. 1 is a diagram illustrating the relation between the distance in the vertical direction and the luminous transmittance (T) in a light shielding material, wherein solid lines illustrate this relation in examples (1 and 2) of the shielding material of the present invention and dotted lines illustrate this relation in examples (3 and 4) of the conventional light shielding material.

The light shielding material of the present invention comprises at least two regions differing in the luminous transmittance in the vertical direction, and if desired, a third region may be disposed so that upper and lower regions are disposed above and below the central region in the vertical direction consecutively thereto.

The central region is a region through which the visual axis passes under a long-distance-seeing condition when the light shielding material is used before eyes as glare-reducing glasses. In the present invention, it is preferred that the above-mentioned region I be located in this central region. In the region I, the luminous transmittance (T) is 30 to 75%, preferably 40 to 70%. If the luminous transmittance (T) of this region is lower than 30%, the sight is reduced by driving of automobiles or the like in the night. If the luminous transmittance of the region I exceeds 75%, no satisfactory glare-reducing effect is attained. It is preferred that in a certain portion of the region I there be no substantial gradient of the luminous density in the vertical direction, and it is indispensable that the region I as a whole should have a width of at least 5 mm in the vertical direction.

As is seen from the foregoing illustration, the frequency of use of this central region is very high in the light shielding material, and the central region (region I) is characterized in that it has a sufficient glare-reducing effect under normal application conditions not only in the night but also in the daytime and reduction of the sight by driving of automobiles or the like in the night is limited to a level causing no substantial trouble or disconvenience.

In the upper portion of the light shielding material, there is disposed a region (region II) where the luminous transmittance is reduced consecutively to the relatively flat gradient of the luminous density. It is important that the region II should include a portion having a luminous transmittance (T) of up to 25%. In order to obtain a sufficient glare-reducing effect and maintain a certain sight, it is preferred that a portion of (T)=5-25% be included in this region. This region has a shading effect of moderating direct rays from the sun in driving of automobiles or the like in the daytime. This region is characterized in that when an automobile or the like is driven in the night or when an especially high glare-reducing effect is required, the region exerts a function of allowing a driver to cast an upward glance while turning his head downward. From the viewpoint of this function, it is preferred that the distance of the region II in the vertical direction be at least 5 mm. The steep gradient of the luminous density of this region, which is consecutive to the relatively flat gradient of the luminous density of the central region, is important for attaining the glare-reducing effect advantageously in combination with the above-mentioned downward movement of the driver's face. Namely, it is important that the region II should have a portion having a luminous density gradient of at least 0.35 per 10 mm of the distance in the vertical direction.

Lenses having a certain gradient of the luminous density are ordinarily known and available as sunglasses and fashion glasses. However, in these lenses, the gradient of the luminous density is decided mainly in view of the aethetic or decorative effect, and ordinarily, the gradient of the luminous density is 0.1 to 0.25 per 10 mm of the distance in the vertical direction. In case of colored lenses having such density gradient, it is impossible to simultaneously satisfy attainment of a high glare-reducing effect and a high sight reduction-preventing effect.

In order to demonstrate characteristic differences of the density gradient pattern of the light shielding material of the present invention over the density gradient pattern of the conventional shielding material, luminous transmittance gradient patterns of typical instances of both the shielding materials are shown in FIG. 1.

In FIG. 1, the abscissa indicates the vertical position of the lens (light shielding material) and the central point is indicated by the one-dot chain line. More specifically, the central point is designated as the zero point, and the upward distance is shown on the right side and the downward distance is shown on the left side. The ordinate indicates the luminous transmittance (T) under the photopic vision condition. Curves 1 and 2 are examples of the density gradient patterns in the light shielding material of the present invention. In each case, the region II including a portion having a steep gradient of the luminous density (the difference of the luminous density is at least 0.35 per 10 mm of the distance in the vertical direction) and a portion having a luminous transmittance (T) of up to 25% is present consecutively to the high transmittance region I. In contrast, in density gradient patterns 3 and 4 of the conventional light shielding material (sunglass), shown in FIG. 1, a region corresponding to the above-mentioned region II is not present at all (the difference of the luminous density is about 0.25 at largest per 10 mm of the distance in the vertical direction).

As pointed out hereinbefore, the distance of the region I in the vertical direction should be at least 5 mm, and generally, the distance of the region II in the vertical direction is adjusted to at least 5 mm.

It is preferred that the distance in the vertical direction be at least 10 mm in each of the regions I and II. The upper limit of this vertical distance of each of the regions I and II differs according to the kind of the light shielding material, the intended use and the application state. Accordingly, the upper limit cannot easily be specified in the present invention. As an ordinary standard of the upper limit, however, there can be mentioned about 40 mm for the region I and about 25 mm for the region II (inclusive of the region III if the region III is formed) when the light shielding material is used as glare-reducing glasses.

In the light shielding material of the present invention, a third region may be disposed below the central portion of the light shielding material consecutively thereto. In this third region, the luminous transmittance (T) may be adjusted to 30 to 100%. Certain practical advantages can be attained by forming such clear region in the lower portion of the light shielding material.

Figure 2A:
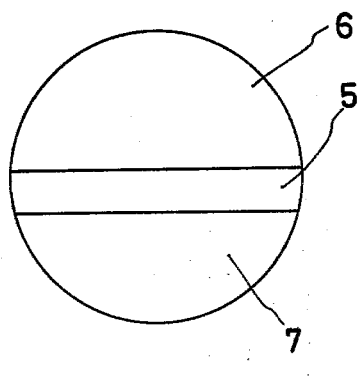
FIGS. 2-A and 2-B are front views of typical instances of the shielding material of the present invention, wherein the pattern of the luminous density gradient of the light shielding material is illustrated.
Figure 2B:
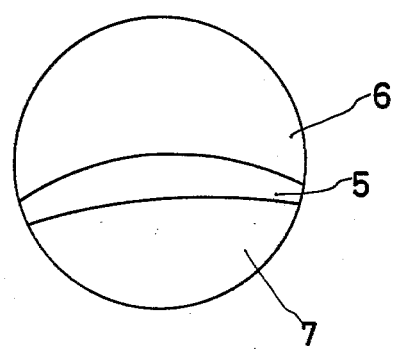

FIGS. 2-A and 2-B are given to illustrate arrangement of the respective regions in the lateral direction in the light shielding material of the present invention and examples of the luminous density gradient pattern. In FIGS. 2-A and 2-B, reference numerals 5, 6 and 7 represent the region I, the region II and the region III, respectively.

In connection with the density gradient pattern in the lateral direction of the light shielding material, for example, the boundary line between the region I (5) and the region II (6) and the boundary line between the region I (5) and the region III (7) may be linear as shown in FIG. 2-A, or each of these boundary lines may be defined by two curves which are downwardly bent toward both the ends as shown in FIG. 2-B. In view of the intended object of the present invention, it will readily be understood that all of arrangements in which one boundary line is linear and the other boundary line is curved, the boundary lines are upwardly bent toward both the ends and the boundary lines include linear segments and curved segments are included in the scope of the present invention. If the region is not uniform with respect to the lateral direction as described above, the width of the region in the vertical direction is, in principle, expressed by the value of the position central with respect to the lateral direction of the light shielding material.

Needless to say, in the present invention, a certain gradient of the luminous density may be formed also in the lateral direction, so far as attainment of the intended effect of the present invention is not inhibited.

In the light shielding material of the present invention, the glare-reducing effect can be further enhanced by appropriately selecting hues of transmittance colors. More specifically, a most preferred region is included in a range obtained by connecting the following four points (A, B, C and D) to one another in order in the XYZ standard colorimetric system decided by CIE (Commission Internationale de l'Eclairage).

Point A: x=0.310, y=0.260
Point B: x=0.400, y=0.260
Point C: x=0.400, y=0.400
Point D: x=0.310, y=0.320

Figure 3:
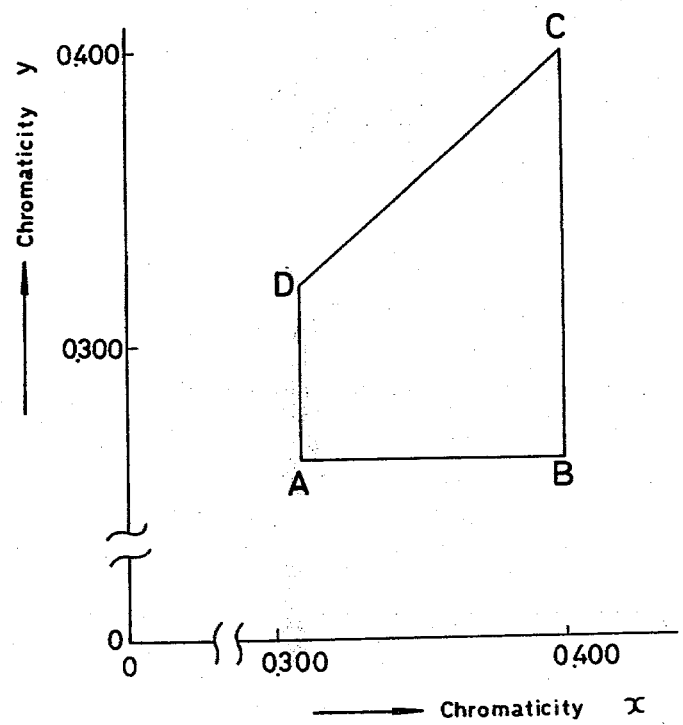
FIG. 3 is a chromaticity coordinates showing a preferred chromaticity range of the transmittance color of the light shielding material of the present invention.

This range is illustrated in FIG. 3. In the present invention, it is preferred that the light shielding material be arranged so that at least the chromaticity of the transmittance color of the region I is included in this range. Of course, in the light shielding material of the present invention, the chromaticity of the transmittance color in the region II and/or the region III may be included in the above range. Hereupon, it must be noted that the hues of yellow glasses and Nd ion-incorporated lenses, which have been considered to be excellent in the glare-reducing effect, are not included in this preferred range in the chromaticity coordinates.

The terms of the XYZ colorimetric system and the measurement method are described in detail in JIS Z-8722, etc., which are summarized below.

The tristimulus values (X, Y and Z) of a transparent substance according to the CIE 1931 standard colorimetric system are determined according to the following formulae:

$$X = K \int_{380nm}^{780nm} P(\lambda)\bar{x}(\lambda)\tau(\lambda)d\lambda$$

$$Y = K \int_{380nm}^{780nm} P(\lambda)\bar{y}(\lambda)\tau(\lambda)d\lambda$$

$$Z = K \int_{380nm}^{780nm} P(\lambda)\bar{z}(\lambda)\tau(\lambda)d\lambda$$

wherein P(λ) stands for the spectral distribution of the CIE standard illuminant C, x̄, ȳ and z̄ are CIE distribution coefficients, τ(λ) stands for the spectral transmittance of the sample, and K is a coefficient represented by the following formula:

$$100 / \int_{380nm}^{780nm} P(\lambda)\bar{y}(\lambda)d\lambda$$

The chromaticity coordinates are determined according to the following formulae:

$$x = \frac{X}{X + Y + Z} \text{ and } y = \frac{Y}{X + Y + Z}$$

The tristimulus values can be directly read from a photoelectric colorimeter.

The light shielding material of the present invention may be composed of a plastic material or glass.

A simplest method for the production of the light shielding material of the present invention comprising dyeing a plastic sheet or lens-shaped molded article. From the viewpoint of preventing formation of scratches, when a plastic sheet or the like is used, it is practically significant that an appropriate surface treatment is combined with this production method. In production of the light shielding material of the present invention, the surface of the starting material need not be limited within a narrow range and means for producing the above-mentioned gradient or distribution of the luminous transmittance is not particularly critical. For example, the light shielding material can easily be prepared by subjecting a colored glass lens to mirror processing by vacuum deposition or the like.

Moreover, means for producing the luminous density gradient specified in the present invention may be appropriately combined with known conventional means such as photochromic treatment, polarizing treatment, incorporation of Nd ions, ultraviolet absorbing processing, infrared absorbing processing, reflection preventing treatment and mirror processing.

When the light shielding material of the present invention is used for glare-reducing glasses (prescribed or plano lenses), clip-on type glare-reducing filters or visors, very excellent practical capacities are exerted. In connection with the application mode, lenses of the light shielding material of the present invention may be attached to a frame having a mechanism capable of moving the lenses in the vertical direction relatively to eyes. In this case, the position of a desired luminous density can be appropriately set.

The characteristic features of the light shielding material of the present invention will now be described in detail by reference to the following Examples that by no means limit the scope of the invention.

EXAMPLE 1

A planolens of polymethyl methacrylate, which had been subjected to the hardening treatment using a silicon type surface hardening paint composed mainly of a mixture of hydrolyzed methyltrimethoxysilane and hydrolyzed γ-methacryloxypropyltrimethoxysilane, was dyed with a chelate dye ("Aizen Polyplon Colour" manufactured by Hodogaya Kagaku Kogyo), to form light shielding materials having luminous transmittance gradient patterns 1, 3 and 4 shown in FIG. 1 and also having chromaticity coordinates of transmittance colors of central portions shown in Table 1.

The chelate dye used was a mixture of diazo type disperse dyes having ligands (—O—, —N= and —S—), that is, Scarlet RLH, Blue Black BLH, Violet RL, Green F3BL and Blue FBRL of the Aizen Polyplon Colour series manufactured by Hodogaya Kagaku Kogyo.

The two light shielding materials of the pattern 1 are typical instances of the light shielding material of the present invention, differing in the chromaticity. The light shielding materials of the patterns 3 and 4 are typical instances of the conventional gradient color lens having a known luminous density gradient. In these instances of the conventional lens, the luminous density gradient is about 0.25 at largest per 10 mm of the distance in the vertical direction.

By using these dyed lenses, glasses were prepared and they were used for driving of automobiles not only in the daytime but also in the night. By this actual driving test, the glare-reducing effect and the degree of reduction of the sight were examined. For comparison, conventional yellow glass lens and Nd ion-incorporated lens were similarly tested. The obtained results are shown in Table 1.

TABLE 1

| Luminous Transmittance Gradient Pattern | Chromaticity Coordinates of Central Portion | Glare-Reducing Effect[3] | Reduction of Sight[4] |
| --- | --- | --- | --- |
| 1 | x = 0.327 | ◎ | ◎ |
|   | y = 0.302 | (A) | (a) |
| 1 | x = 0.293 | O | ◎ |
|   | y = 0.302 | (B) | (a) |
| 3 (comparison) | x = 0.339 | Δ | ◎ |
|   | y = 0.308 | (C) | (a) |
| 4 (comparison) | x = 0.360 | ◎ | X |
|   | y = 0.303 | (A) | (b) |
| yellow glass[1] (uniform density) (comparison) | x = 0.413 | X | ◎ |
|   | y = 0.471 | (D) | (a) |
| Nd ion-incorporated lens[2] (uniform density) (comparison) | x = 0.297 | X | ◎ |
|   | y = 0.308 | (D) | (b) |

Note:
[1]luminous transmittance = 87%
[2]luminous transmittance = 81%
[3]
- ◎ (A): very satisfactory level
- O (B): considerable effect
- Δ (C): effect was observed but not satisfactory
- X (D): no practical glare-reducing effect

[4]
- ◎ (a): no substantial reduction of the sight
- X (b): sense of practical risk The chromaticity was determined by a color difference meter (Model AUD-SCH-3 manufactured by Suga Shikenki) modified so that a sample having an area 10 cm in diameter could be measured.

EXAMPLE 2

A commercially available planolens CR-39 (75 mm in diameter) was dyed with a commercially available disperse dye to form two light shielding materials of the luminous transmittance gradient pattern 2 shown in FIG. 1, which were different in the chromaticity. The disperse dye used was a mixture of Dianix Yellow 5RE, Diacelliton Fast Yellow GL, Dianix Red AC-E and Dianix Blue BG-FS, each being a product of Mitsubishi Kasei.

In the same manner as described in Example 1, glasses were prepared and their practical proterties for driving of automobiles were examined. The obtained results are shown in Table 2.

TABLE 2

| Luminous Transmittance Gradient Pattern | Chromaticity Coordinates of Central Portion | Glare-Reducing Effect | Reduction of Sight |
| --- | --- | --- | --- |
| 2 | x = 0.3.44 | ◎ | ◎ |
|   | y = 0.325 | (A) | (a) |
| 2 | x = 0.313 | O | ◎ |
|   | y = 0.334 | (B) | (a) |

What is claimed is:

1. A light shielding material having a gradient of the luminous transmittance (T) in the vertical direction, which comprises at least two regions I and II differing in the luminous transmittance (T), said region I having a width of at least 5 mm in the vertical direction and a luminous transmittance (T) of 30 to 75% under the photopic vision condition, and said region II being disposed above said region I and consecutive thereto and including a portion in which the difference of the luminous density, expressed in terms of the common logarithm of the reciprocal of the luminous transmittance (T), is at least 0.35 per 10 mm of the vertical distance and a portion in which the luminous transmittance (T) is up to 25%.

2. A light shielding material as set forth in claim 1 wherein the luminous transmittance (T) in the region I is 40 to 70%.

3. A light shielding material as set forth in claim 1 wherein the lower limit of the luminous transmittance (T) in the region II is 5%.

4. A light shielding material as set forth in claim 1 wherein the width of the region II in the vertical direction is at least 5 mm.

5. A light shielding material as set forth in claim 1 wherein the region I has a transmittance color chromaticity included within a range of chromaticity coordinates obtained by connecting the following 4 points to one another in order in the XYZ standard colorimetric system:
Point A: x=0.310, y=0.260
Point B: x=0.400, y=0.260
Point C: x=0.400, y=0.400
Point D: x=0.310, y=0.320

6. A light shielding material having a gradient of the luminous transmittance (T) in the vertical direction, which comprises three regions I, II and III differing in the luminous transmittance (T), said region I being a central region having a width of at least 5 mm in the vertical direction and a luminous transmittance (T) of 30 to 75% under the photopic vision condition, said region II being an upper region disposed above said region I consecutively thereto, which has a width of at least 5 mm in the vertical direction and a luminous transmittance (T) of 5 to 25% and includes a portion in which the difference of the luminous density, expressed in terms of the common logarithm of the reciprocal of the luminous transmittance (T), is at least 0.35 per 10 mm of the vertical distance, and said region III being a lower region disposed below said region I consecutively thereto, which has a luminous transmittance (T) of 30 to 100%.

7. A light shielding material as set forth in claim 6 wherein the luminous transmittance in the region I is 40 to 70%.

8. A light shielding material as set forth in claim 6 wherein the region I has a transmittance color chromaticity included within a range of chromaticity coordinates obtained by connecting the following 4 points to one another in order to the XYZ standard colorimetric system:
Point A: x=0.310, y=0.260
Point B: x=0.400, y=0.260
Point C: x=0.400, y=0.400
Point D: x=0.310, y=0.320

* * * * *